2,994,580
HYDROMETALLURGICAL PROCESS
Wayne C. Hazen and Angus V. Henrickson, Boulder, Colo., assignors to Kerr-McGee Oil Industries, Inc., a corporation of Delaware
No Drawing. Filed Jan. 24, 1957, Ser. No. 635,947
8 Claims. (Cl. 23—14.5)

The present invention relates to the preparation of very pure concentrates of uranium and more particularly to a novel process for preparing anhydrous uranium tetrafluoride substantially of green salt grade.

The extraction of uranium from aqueous solutions with suitable organic extractants for uranium in either the plus 4 or 6 oxidation state is well known. Normally, the organic extractant for uranium is dissolved or dispersed in a water-immiscible inert carrier and the resulting solution or dispersion intimately contacted with an aqueous solution of uranium in either the plus 4 or 6 oxidation state. The resulting uranium loaded extract, i.e., the solution of uranium loaded organic extractant, is then separated from the extracted aqueous solution and stripped with an aqueous solution of either a mineral acid or base to thereby obtain a concentrate of uranium suitable for further processing into the desired final product.

One of the more desirable final products is commonly known as "green salt." The term "green salt" as used herein is intended to mean a product meeting specifications for anhydrous uranium tetrafluoride. Such specifications require, among other things, that the uranium tetrafluoride content be in the anhydrous state, i.e., $UF_4$, and that no detectable amounts of molybdenum be present. In processing the more commonly occurring Colorado Plateau type carnotite ores, it has been found that once the above specifications for green salt are met, the remaining specifications generally do not present any major problem and may be met without resorting to expensive further treatment.

Heretofore, the preparation of green salt from an uranium loaded organic extractant has involved many intricate and complicated processing steps. One of the common presently practiced processes for preparing green salt from an uranium loaded organic extractant comprises a stripping step with 5% to 40% aqueous hydrofluoric acid solution. The uranium content is obtained as a hydrated precipitate having the formula $UF_4 \cdot XH_2O$ when the uranium is present in the plus 4 oxidation state. The value of X is primarily a function of the temperature at which the stripping step is carried out, and has a value of about 4 at stripping temperatures below 80° C., while at higher stripping temperatures the value is about 1. In all instances, however, a hydrated precipitate is obtained containing trace impurities in objectionable amounts, and that must be further purified by involved costly processes in order to meet green salt specifications. For example, when the above mentioned stripping step is carried out at room temperature, the uranium tetrafluoride precipitates as an amorphous green mass which is extremely difficult to wash and filter. If it is desired to convert this amorphous precipitate to an easily washable and filterable crystalline material, it is necessary to digest the precipitate in dilute HF (0.1 to 0.3%) for a period ranging from a few hours to a few days, depending on the nature of the particular precipitate and other factors. After filtering and drying the crystalline precipitate so prepared, the uranium tetrafluoride is obtained as a hydrate having the approximate formula $2UF_4 \cdot 5H_2O$. It is then necessary to heat this product to 400–500° F. in the presence of anhydrous hydrogen fluoride to prepare anhydrous uranium tetrafluoride.

Further, the precipitation of hydrated uranium tetrafluoride from aqueous solutions or with an aqueous fluoride, results in a precipitate of hydrated uranium tetrafluoride which contains appreciable amounts of substances forming double salts with uranium tetrafluoride, such as salts of sodium and potassium. Even when following the best procedures and under the most favorable conditions, the precipitate contains at least 0.1% sodium when hydrated uranium tetrafluoride is precipitated from a solution of sodium uranate or diuranate dissolved in excess (more than 100%) aqueous hydrogen fluoride.

Because of the involved time consuming and expensive processes which have been available heretofore for the preparation of anhydrous uranium tetrafluoride of green salt grade, there has long been a great need for a simple efficient process for the preparation of anhydrous uranium tertrafluoride substantially of green salt grade directly from an uranium loaded organic extractant. However, the art has not been able to provide such a process prior to the present invention.

Accordingly, it is a principal object of the present invention to provide a novel process for preparing anhydrous uranium tetrafluoride substantially of green salt grade.

It is still a further object of the present invention to provide a novel process for preparing anhydrous uranium tetrafluoride substantially of green salt grade from source materials such as aqueous solutions or leach liquors containing uranium.

It is a further object of present invention to provide a novel process for stripping uranium from suitable uranium loaded organic extractants for uranium using anhydrous hydrogen fluoride as the stripping agent.

It is a further object of the present invention to provide a novel process for preparing anhydrous uranium tetrafluoride as an easily filterable crystalline precipitate essentially free of molybdenum and substantially of green salt grade by precipitaing uranium, in the plus 4 oxidation state, from a solution of suitable uranium loaded organic extractant for uranium dissolved in inert solvent with anhydrous hydrogen fluoride.

Still other objects and advantages of the present invention will be apparent to those skilled in the art by reference to the following detailed description and the specific examples.

We have discovered that very pure anhydrous uranium tetrafluoride may be precipitated with anhydrous hydrogen fluoride directly from suitable uranium loaded organic extractants for uranium containing uranium in the plus 4 oxidation state. The resulting anhydrous uranium tetrafluoride is an easily filterable crystalline precipitate substantially free of trace contaminates and may be readily recovered and washed to give a product of substantially green salt grade without an additional extensive treatment.

Broadly stated, the process of the present invention comprises stripping uranium in the plus 4 oxidation state from a dry uranium loaded organic extractant with anhydrous hydrogen fluoride. The resulting uranium tetrafluoride is an anhydrous, easily filterable, crystalline precipitate essentially free of molybdenum, and substantially of green salt grade after a simple washing step to remove occluded organic phosphates. Thus, it is possible to meet green salt specifications by a process involving only direct precipitation of uranium tetrafluoride from the uranium loaded organic extractant and simple washing of the precipitate, and without any necessity for an additional extensive treatment of the precipitate. Furthermore, for some reason, the anhydrous uranium tetrafluoride prepared in accordance with the present invention is much less hydroscopic than anhydrous uranium tetrafluoride prepared from hydrated uranium tetrafluoride by the presently used involved procedures, and thus is a more desirable product since the allowable moisture content of green salt is very critical. The numerous advantages of the process of the present invention will be readily apparent to those skilled in the art.

The uranium loaded extractant for use in the present invention may be obtained by any suitable process. For example, a finely divided carnotite ore may be leached with dilute sulfuric acid and the uranium pregnant sulfuric acid leach liquor thus obtained de-slimed by any suitable method to produce a clear liquor. This liquor, which normally contains uranium in the plus 4 and 6 oxidation states, before a reduction step, may be intimately contacted with a suitable organic extractant for uranium in an extraction unit, such as a four-stage counter-current mixer-settler. The uranium loaded extractant thus prepared is then separated from the extracted sulfuric acid leach liquor. Preferably, the organic extractant is first dissolved in a water-immiscible inert solvent in quantities sufficient to form about a 5 to 10% solution, by volume, and the solution contacted with the sulfuric acid leach liquor. The resulting solution of uranium loaded extractant is then separated from the extracted sulfuric acid leach liquor. The pH of the foregoing sulfuric acid leach liquor may be from about 0.5 to 6 at the time of contacting the same with the organic extractant, with the preferred pH being within the range of about 1.5 to 2.0. Also, the sulfuric acid leach liquor may be first treated with scrap iron, magnesium, zinc, etc., to reduce uranium which is present in the plus 6 oxidation state to the plus 4 oxidation state prior to its extraction. However, where a double extraction process is used, the reduction of uranium in the plus 6 oxidation state may occur after the first extraction step in order to conserve reducing agent.

For example, where a double extraction process is to be used, the first extract of uranium as prepared above and containing uranium in the plus 6 oxidation state may be stripped with 10% sodium carbonate solution. The resulting uranium pregnant strip solution is acidified with 0.5 N HCl and then uranium in the plus 6 oxidation state is reduced. The reduction may be conveniently and easily accomplished by means of a Jones reductor arrangement, with the reductor containing a suitable reductor material such as zinc amalgam, scrap iron, aluminum, magnesium, etc. Contact with the reductor material is controlled to give effluent liquor containing only uranium in the plus 4 oxidation state. This liquor then may be extracted with a suitable organic extractant for uranium to provide the uranium loaded organic extractant for processing in accordance with the present invention.

In some instances, it may be desirable to use a mixture of several reducing agents in order to prevent the introduction of excessive amounts of extraneous contaminates during the reducing step. For this reason, electrolytic reduction of uranium is preferred in order to prevent the introduction of traces of extraneous materials in the final product.

The nature of organic extractants useful for the extraction of uranium from aqueous solutions and the advantages and limitations of each are particularly described in the prior art. Inasmuch as the nature of the specific suitable organic extractant for uranium to be selected does not form a part of the present invention, further discussion of the advantages and limitations of each is not believed to be necessary. However, it may be stated that the presently preferred organic extractants for uranium are the suitable organic phosphate extractants for uranium. Of the suitable organic phosphate extractants for uranium, the branched chain alkyls such as 2-ethylhexyl phosphoric acid and di-2-ethyl phosphoric acid are preferred since such extractants are almost immune to emulsion problems. In general, the branched chain mono- and di-alkyl phosphoric acids are to be preferred over the straight chain mono- and di-phosphoric acids since, in some instances, emulsion problems arise with the latter. Tributyl phosphate and ether may be used satisfactorily to extract uranium from solutions containing a high concentration of nitrate ion and may be desirable as an extractant in some instances. It may also be desirable to use a mixture of extractants such as di-2-ethylhexyl phosphoric acid and tributyl phosphate since the need for excessive wash requirements may be reduced on certain types of ores. It is understood that where the term "neutral and acidic organic extractants for uranium" appears herein, it is understood to include that family of suitable neutral and acidic organic extractants for uranium such as the above mentioned suitable organic phosphoric acids having a mono-, di- or tri-substituent. It is further understood that the term "neutral and acidic organic extractants for uranium" is not intended to include organic basic uranium extractants such as amines, or organic extractants for uranium which form a precipitate with the anhydrous hydrogen fluoride under the stripping conditions.

As mentioned above, it is often desirable to first dissolve the organic extractant for uranium in a water-immiscible inert solvent. Examples of suitable water-immiscible inert solvents include light petroleum distillates, such as kerosene, etc., lower boiling hydrocarbons of either the paraffinic or aromatic type and their halogenated homologues which are inert, the lower water-immiscible ketones, esters, etc. The inert light petroleum distillates such as kerosene or other light naphthas are preferred for economic reasons.

Once the uranium loaded organic extractant is obtained, whether by one of the aforementioned processes or other suitable process, if desirable, it may be washed either with water, a suitable salt solution, or an acidic solution such as a sulfuric acid solution having a pH of about 0.5, for the purpose of reducing occluded impurities. After the washing treatment, the uranium loaded extractant is dried by any suitable method such as by blowing with warm nitrogen or other suitable non-oxidizing gas or gases.

Suitable solid or liquid drying agents also may be used, but are not generally as readily available as gaseous drying agents and thus are not preferred, in general, for economic reasons.

Once the dried uranium loaded extractant is obtained, it being understood that the uranium present is now in the plus 4 oxidation state, it is then contacted with anhydrous hydrogen fluoride. Preferably, the uranium loaded organic extractant is contacted with cold, anhydrous gaseous hydrogen fluoride by simply bubbling the same into the uranium loaded organic extractant, or a solution thereof in a water-immiscible inert solvent. Preferably, sufficient anhydrous hydrogen fluoride is bubbled into the uranium loaded organic extractant, or a solution thereof, to saturate the same and thereby precipitate a maximum amount of the uranium present as anhydrous uranium tetrafluoride. The preferred temperature at which the anhydrous hydrogen fluoride is added is sufficiently low for the hydrogen fluoride to exist in a polymeric form, e.g., as $H_2F_2$, and is usually under 100° F. The resulting precipitate of anhydrous uranium tetrafluoride is crystalline, readily filterable, and is easily recovered by simple filtration. The recovered precipitate is then washed with a suitable substance, such as one of the lower alcohols, e.g., ethyl alcohol, and then dried. If it is desirable to remove occluded organic phosphates, then the precipitate is washed with octyl alcohol or other suitable higher alcohol. Upon analysis, the anhydrous uranium tetrafluoride thus prepared is found to be substantially of green salt grade. The product does not contain detectable amounts of molybdenum and, in addition, the precipitate is essentially anhydrous and non-hydroscopic.

The foregoing detailed description of the present invention and the following specific examples are for the purpose of illustration only and are not to be taken as limiting to the spirit or scope of the appended claims.

*Example I*

A finely divided Colorado Plateau-type carnotite ore was leached with aqueous sulfuric acid and the resulting uranium pregnant leach liquor de-slimed by conventional procedure to give substantially a clean liquor having a pH of about 1.5. The uranium pregnant leach liquor thus prepared was contacted with a kerosene solution containing 5% by volume di-2-ethylhexyl phosphoric acid and 4.4% by volume tributyl phosphate in an extraction unit comprising a four-stage countercurrent mixer-settler using an aqueous to organic phase ratio of about 1:1. The kerosene solution of uranium loaded di-2-ethylhexyl phosphoric acid and tributyl phosphate thus produced was separated from the extracted leach liquor and then stripped of uranium with an aqueous 10% sodium carbonate solution in a two-stage mixer-settler. The resulting carbonate strip liquor analyzed approximately 40 g./l. of $U_3O_8$ and was divided into portions for use in the following examples.

*Example II*

A first portion of the carbonate strip liquor from Example I was acidified with 0.5 N HCl and electrolytically reduced to give a solution containing uranium in the plus 4 oxidation state. This solution was then extracted following the extraction procedure of Example I with a sulfuric acid washed kerosene solution containing 8.8% by volume tributyl phosphate and 5% by volume di-2-ethylhexyl phosphoric acid. (It has been found that if the di-2-ethylhexyl phosphoric acid concentration exceeds about 10%, a solid precipitate of di-2-ethylhexyl uranium phosphate may be formed if the $U_3O_8$ concentration is high.)

The solution of uranium loaded extractant thus produced was separated, water washed and dried by passing warm nitrogen through the solution. Then, cold anhydrous gaseous hydrogen fluoride was bubbled through the solution of uranium loaded extractant until the solution appeared to be saturated with hydrogen fluoride gas. Anhydrous uranium tetrafluoride readily precipitated from the solution as an easily filterable crystalline precipitate, and was easily recovered upon centrifuging the solution as a powdery, greeny solid of anhydrous uranium tetrafluoride.

The recovered greenish precipitate of anhydrous uranium tetrafluoride was repulped with ethyl alcohol, and the ethyl alcohol removed by centrifuging. The recovered washed product was then given an additional washing, i.e., repulped with ethyl alcohol and centrifuged. The anhydrous uranium tetrafluoride recovered from the final washing was dried at 110° C. and found to meet all green salt specifications for trace elements except phosphorus. No detectable amounts of molybdenum were present. If it is desired to remove occluded organic phosphates and thereby produce a product meeting green salt specifications, the precipitate is washed with a suitable higher alcohol for the purpose of removing occluded organic phosphates.

*Example III*

A second portion of the carbonate strip liquor from Example I was treated in the manner outlined in Example II, except that the reduction of uranium from the plus 6 oxidation state to the plus 4 oxidation state was accomplished by means of a Jones reductor containing zinc amalgam. The anhydrous uranium tetrafluoride produced in this example was analyzed and found to contain 1000 p.p.m. of phorphorus, 200 p.p.m. of zinc and no detectable amounts of molybdenum. It should be noted that this analysis was after the washing steps with ethyl alcohol, and without a further washing step with a higher alcohol. Thus, by a thorough washing with a suitable higher alcohol to remove occluded organic phosphates, this product would meet the specifications required for green salt.

*Example IV*

A third portion of the carbonate strip liquor from Example I was treated in the manner outlined in Example III, except that aqueous ammonium fluoride was used to strip the uranium instead of cold anhydrous gaseous hydrogen fluoride, i.e., the polymeric form. The hydrated uranium tetrafluoride thus precipitated was recovered by centrifuging and then washed with ethyl alcohol by repulping twice and centrifuging between each repulping. The final washed product was dried at 110° C. and, upon analysis, was found to contain 1000 p.p.m. of molybdenum, 500 p.p.m. of zinc and 1000 p.p.m. of phosphorus.

As is well known, it is not possible to remove molybdenum from precipitated uranium tetrafluoride by a simple washing step. Washing the above prepared precipitate with a higher alcohol, while removing occluded organic phosphates, would not reduce the molybdenum content. Thus, the precipitated hydrated uranium tetrafluoride ($UF_4 \cdot XH_2O$) would not meet green salt specifications after washing due to the presence of water of hydration and molybdenum, both water of hydration and molybdenum being critical in green salt specifications. Therefore, it would not be possible to meet green salt specifications without extensive further treatment of the precipitated hydrated uranium tetrafluoride.

What is claimed is:

1. A process for preparing anhydrous uranium tetrafluoride substantially of green salt grade comprising stripping uranium from a dry uranium loaded organic phosphate extractant for uranium with anhydrous hydrogen fluoride, the uranium loaded organic phosphate extractant containing uranium in the plus 4 oxidation state at least during the stripping step.

2. A process for preparing anhydrous uranium tetrafluoride substantially of green salt grade comprising stripping uranium from a dry solution containing at least one uranium loaded organic phosphate extractant for uranium dissolved in an inert solvent with anhydrous gaseous hydrogen fluoride to produce an easily filterable crystalline precipitate of anhydrous uranium tetrafluoride, the solution of uranium loaded organic phosphate extractant containing uranium in the plus 4 oxidation state at least during the stripping step.

3. A process for preparing anhydrous uranium tetrafluoride substantially of green salt grade comprising extracting uranium from an aqueous solution thereof with at least one organic phosphate extractant for uranium dissolved in a water-immiscible inert solvent to produce a solution of uranium loaded organic phosphate extractant, separating the solution of uranium loaded organic phosphate extractant thus produced from the extracted aqueous solution, drying the separated solution of uranium loaded organic phosphate extractant, stripping uranium from the dried solution of uranium loaded organic phosphate extractant with anhydrous hydrogen fluoride, the solution of uranium loaded organic phosphate extractant containing uranium in the plus 4 oxidation state at least during the stripping step, and recovering precipitated anhydrous uranium tetrafluoride.

4. A process for preparing anhydrous uranium tetrafluoride substantially of green salt grade comprising extracting uranium from an aqueous solution thereof with at least one organic phosphate extractant for uranium dissolved in an inert light petroleum distillate solvent to produce a solution of uranium loaded organic phosphate extractant, separating the solution of uranium loaded organic phosphate extractant thus produced from the extracted aqueous solution, drying the separated solution of uranium loaded organic phosphate extractant, stripping uranium from the dried solution of uranium loaded organic phosphate extractant with cold anhydrous gaseous hydrogen fluoride to produce an easily filterable crystalline precipitate of anhydrous uranium tetrafluoride essentially free of molybdenum, the solution of uranium loaded organic phosphate extractant containing uranium in the plus 4 oxidation state at least during the stripping step, and recovering the precipitated anhydrous uranium tetrafluoride.

5. A process for preparing anhydrous uranium tetrafluoride substantially of green salt grade comprising stripping uranium from dry uranium loaded di-2-ethylhexyl phosphoric acid with anhydrous hydrogen fluoride, the uranium loaded di-2-ethylhexyl phosphoric acid containing uranium in the plus 4 oxidation state at least during the stripping step.

6. A process for preparing anhydrous uranium tetrafluoride substantially of green salt grade comprising stripping uranium from a dry solution containing uranium loaded di-2-ethylhexyl phosphoric acid dissolved in an inert solvent with anhydrous gaseous hydrogen fluoride to produce an easily filterable crystalline precipitate of anhydrous uranium tetrafluoride, the solution of uranium loaded di-2-ethylhexyl phosphoric acid containing uranium in the plus 4 oxidation state at least during the stripping step.

7. A process for preparing anhydrous uranium tetrafluoride substantially of green salt grade comprising extracting uranium from an aqueous solution thereof with an extractant comprising di-2-ethylhexyl phosphoric acid dissolved in a water-immiscible inert solvent to produce a solution of uranium loaded extractant, separating the solution of uranium loaded extractant thus produced from the extracted aqueous solution, drying the separated solution of uranium loaded extractant, stripping uranium from the dried solution of uranium loaded extractant with anhydrous hydrogen fluoride, the solution of uranium loaded extractant containing uranium in the plus 4 oxidation state at least during the stripping step, and recovering precipitated anhydrous uranium tetrafluoride.

8. A process for preparing anhydrous uranium tetrafluoride substantially of green salt grade comprising extracting uranium from an aqueous solution thereof with an extractant comprising di-2-ethylhexyl phosphoric acid dissolved in inert light petroleum distillate solvent to produce a solution of uranium loaded extractant, separating the solution of uranium loaded extractant thus produced from the extracted aqueous solution, drying the separated solution of uranium loaded extractant, stripping uranium from the dried solution of uranium loaded extractant with cold anhydrous gaseous hydrogen fluoride to produce an easily filterable crystalline precipitate of anhydrous uranium tetrafluoride essentially free of molybdenum, the solution of uranium loaded extractant containing uranium in the plus 4 oxidation state at least during the stripping step, and recovering the precipitated anhydrous uranium tetrafluoride.

References Cited in the file of this patent
UNITED STATES PATENTS

| | | |
|---|---|---|
| 2,534,677 | Newton et al. | Dec. 19, 1950 |
| 2,567,145 | Carignan | Sept. 4, 1951 |
| 2,769,686 | McCullough et al. | Nov. 6, 1956 |

OTHER REFERENCES

Katz et al.: The Chemistry of Uranium, National Nuclear Energy Series, 1951, McGraw-Hill Book Co., New York, pages 361–365. (Copy in Scientific Library.)